United States Patent [19]
Dilley

[11] Patent Number: 5,641,547
[45] Date of Patent: Jun. 24, 1997

[54] INJECTION MOLDED TRIM STRIP AND METHOD FOR MAKING SAME

[75] Inventor: David Dwight Dilley, Centerville, Ohio

[73] Assignee: Plastic Trim, Inc., Dayton, Ohio

[21] Appl. No.: 531,168

[22] Filed: Sep. 13, 1995

[51] Int. Cl.$^6$ ............................................... B32B 9/00
[52] U.S. Cl. .................... 428/31; 428/60; 428/67; 428/81; 428/121; 428/126; 428/130; 428/172; 428/192; 293/128; 264/138; 264/145; 264/148; 264/296; 156/211; 156/244.11; 156/244.19
[58] Field of Search ...................... 428/31, 126, 60, 428/121, 130, 172, 192, 81, 67; 264/138, 148, 296, 145; 293/128; 156/244.19, 244.11, 211

[56] References Cited

U.S. PATENT DOCUMENTS

| | | |
|---|---|---|
| 4,617,209 | 10/1986 | Ives . |
| 4,619,847 | 10/1986 | Jackson . |
| 4,719,067 | 1/1988 | Thiel . |
| 5,069,849 | 12/1991 | Wain . |
| 5,227,108 | 7/1993 | Reid, Jr. et al. .................. 264/148 |
| 5,350,608 | 9/1994 | Zoller ................................. 428/31 |
| 5,419,863 | 5/1995 | Henderson ......................... 264/148 |

FOREIGN PATENT DOCUMENTS 61-132315  6/1986  Japan .

*Primary Examiner*—Patrick Ryan
*Assistant Examiner*—Abraham Bahta
*Attorney, Agent, or Firm*—Killworth, Gottman, Hagan & Schaeff, L.L.P.

[57] ABSTRACT

An injection molded trim strip and a method for its formation are provided. The method comprises the steps of: providing an elongate, polymeric strip having an upper surface, a lower surface which is spaced from the upper surface and first and second ends; removing material from the polymeric strip inwardly from at least one of the first and second ends so as to create a modified strip; and injection molding with a polymeric material to fill at least a portion of an area formerly occupied by the removed material to create a trim strip having an intermediate surface extending between the upper and lower surfaces formed from the injected polymeric material. The trim strip comprises an elongate, polymeric strip of a predefined length having an upper surface, a lower surface which is spaced from the upper surface, and first and second ends, at least one of the first and second ends having a recess, and at least a portion of the recess being filled with polymeric filler material defining an intermediate surface extending between the upper and lower surfaces.

9 Claims, 8 Drawing Sheets

INJECTION MOLDED TRIM STRIP AND METHOD FOR MAKING SAME

BACKGROUND OF THE INVENTION

The present invention relates to improvements in trim strips and, more particularly, to a method for making an improved trim strip having a specially formed end portion, and to the improved trim strip produced thereby.

Trim strips are frequently used as protective and/or decorative accessories for motor vehicles, boats, aircraft, appliances, machines and other apparatus. For example, trim strips can be employed as body side molding on motor vehicles to provide impact protection from door strikes and also to enhance the aesthetic appeal of the vehicle.

The prior art trim strip shown in FIG. 1 includes an end cap 8 positioned at the end portion of the trim strip 6. End caps are commonly used to eliminate sharp edges on the end portion of the trim strip. As shown in FIGS. 1 and 2, the seam line 10 created between the end cap and the remainder of the trim strip is visible on the show surface 12 of the trim strip 6. A decorative portion 14, for example a metallic strip, is provided on the show surface 12 of the trim strip 6. The surface area for bonding between the end cap portion and the remainder of the trim strip is minimal, leading to end cap detachment upon exposure to adverse conditions, i.e., salt, temperature variations, wind, contact with foreign objects, etc.

Accordingly, there is a need for an improved method for forming a trim strip which provides for improved durability and aesthetics while maintaining feasible production costs.

SUMMARY OF THE INVENTION

This need is met by the present invention wherein an improved trim strip is provided having an injection molded end portion.

In accordance with one aspect of the present invention, a method is provided for forming a trim strip. The method comprises the steps of: providing an elongate, polymeric strip having an upper surface, a lower surface which is spaced from the upper surface and first and second ends; removing material from the polymeric strip inwardly from at least one of the first and second ends so as to create a modified strip; and injection molding with a polymeric material to fill at least a portion of an area formerly occupied by the removed material to create a trim strip having an intermediate surface extending between the upper and lower surfaces formed from the injected polymeric material.

The step of removing material from the polymeric strip may further comprise removing material inwardly from a first section of the lower surface. Further, the trim strip may include a first surface formed from the injected polymeric material which occupies at least a portion of an area previously occupied by removed material located in the first section of the lower surface.

An adhesive may be applied to the at least one end prior to the injection molding step. The removing may be accomplished by, for example, grinding or skiving the polymeric strip.

According to a second aspect of the present invention, a trim strip is provided comprising an elongate, polymeric strip of a predefined length having an upper surface, a lower surface which is spaced from the upper surface, and first and second ends, at least one of the first and second ends having a recess, and at least a portion of the recess being filled with polymeric filler material defining an intermediate surface extending between the upper and lower surfaces. The trim strip may further include an adhesive positioned between the polymeric filler material and the polymeric strip.

The polymeric strip may comprise a first outer layer of first material having an outer surface which defines the upper surface of the polymeric strip and a second core layer of second material which comprises a remainder of the polymeric strip.

In accordance with a third aspect of the present invention, a method is provided for forming a trim strip. The method comprises the steps of: providing an elongate, polymeric strip; cutting the elongate strip to create a polymeric strip of a predefined length having a first surface, a second surface which is spaced from the first surface and first and second ends; removing material from at least one of the first and second ends; and injection molding with a polymeric material to create an injection molded portion, the injection molded portion occupying at least a portion of an area formerly occupied by the removed material, and being continuous with at least the first surface.

The injection molded portion may be continuous with the second surface, may occupy an area formerly occupied by a first section of the second surface and/or may contact a second section of the second surface.

An adhesive may be applied to the at least one end prior to the injection molding step. The removing may be accomplished by grinding or skiving a portion of the polymeric strip.

According to a fourth aspect of the present invention, a trim strip is provided comprising an elongate, polymeric strip having a predefined length, a first surface, a second surface which is spaced from the first surface and first and second ends, at least one of the first and second ends having a cavity and at least a portion of the cavity being filled with polymeric filler material such that the polymeric filler material defines an intermediate surface continuous with at least the first surface.

The intermediate surface may be continuous with the second surface, may occupy an area formerly occupied by a first section of the second surface, and/or may contact a second section of the second surface. An adhesive may be positioned between the polymeric filler material and the polymeric strip. The polymeric strip may comprise a first outer layer of first material having an outer surface which defines the upper surface of the polymeric strip and a second core layer of second material which comprises a remainder of the polymeric strip.

Accordingly, it is an object of the present invention to provide a trim strip having improved durability and aesthetic appearance. It is a further object of the present invention to provide a satisfactory trim strip at minimum production cost. These and other objects and advantages of the present invention will be apparent from the following description, the accompanying drawings, and the appended claims.

DETAILED DESCRIPTION OF THE INVENTION

Figure 1:
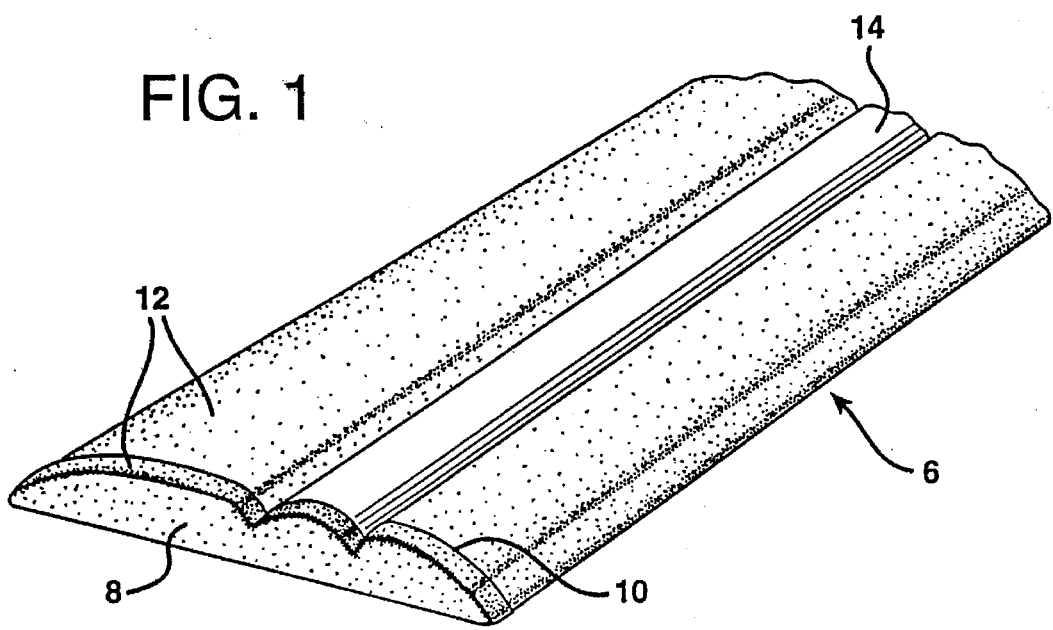
FIG. 1 is a perspective view, broken away, of a prior art trim strip.
Figure 2:
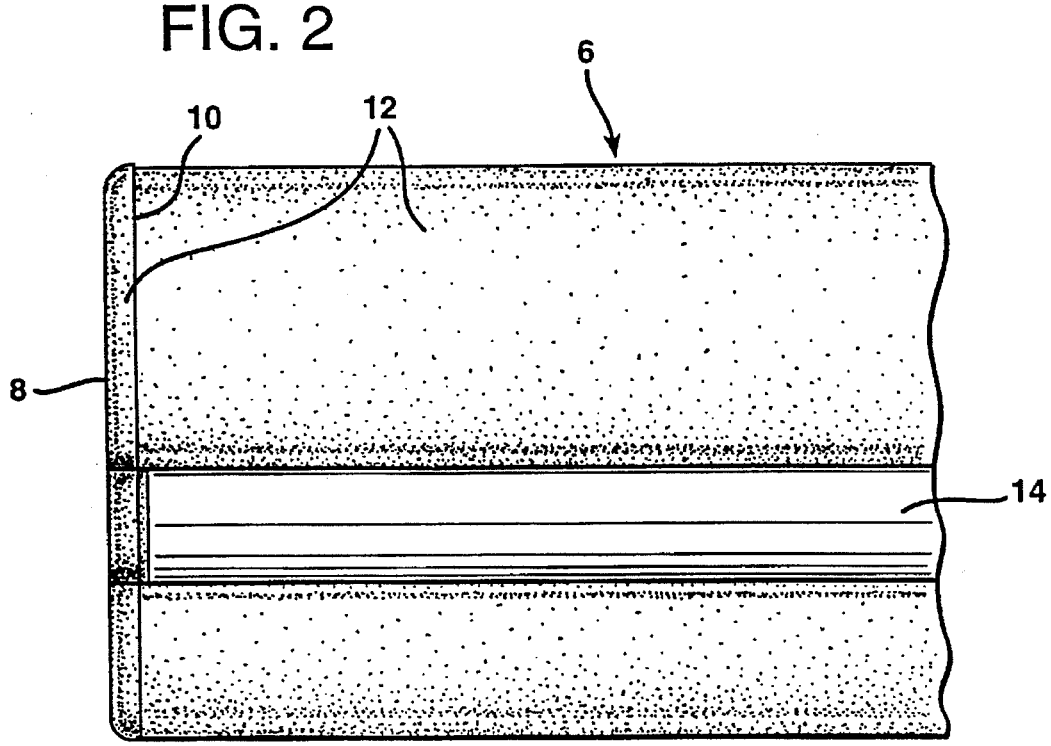
FIG. 2 is a top view, broken away, of the trim strip shown in FIG. 1.
Figure 3:
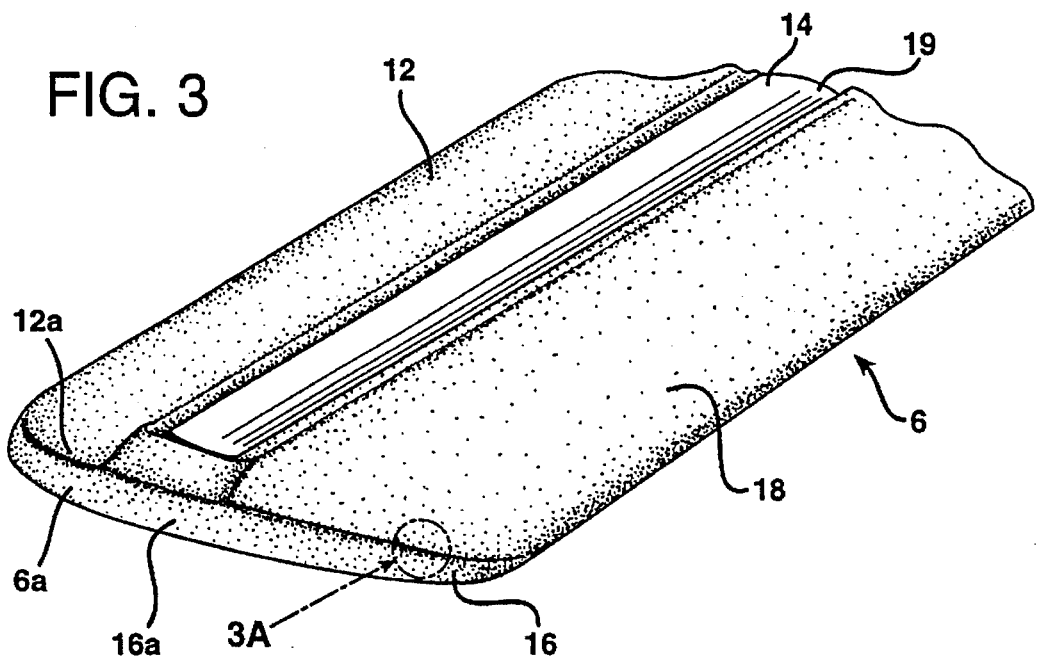
FIG. 3 is a perspective view, broken away, of a trim strip according to a first embodiment of the present invention.
Figure 3A:
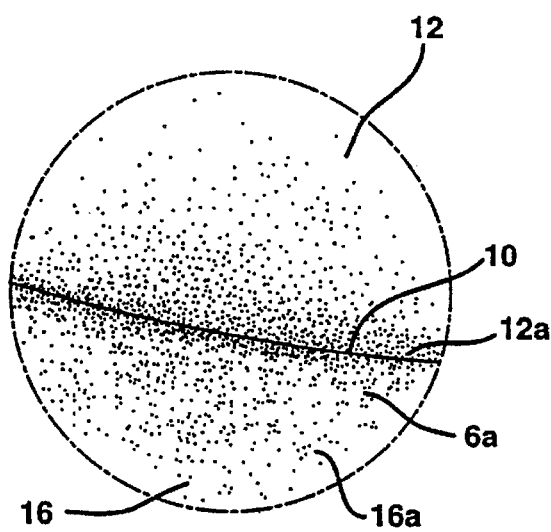
FIG. 3A is a magnified view of a portion of the trim strip shown in FIG. 3.
Figure 5C:
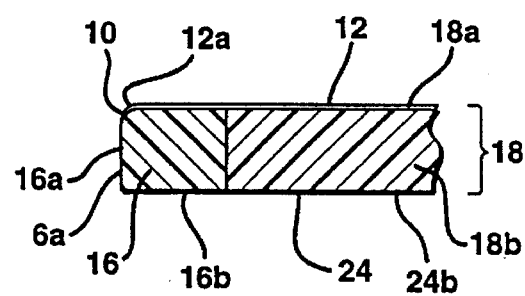
FIG. 5C is a cross-sectional view of an end portion of the trim strip shown in FIG. 5B.

FIG. 3 is a perspective view, broken away, of a first embodiment of a trim strip 6 according to the present invention. FIG. 3A is a magnified view of a portion of the trim strip shown in FIG. 3. The trim strip 6 includes an intermediate portion 16 which has been injection molded to fill an area voided by a grinding or cutting process. The intermediate portion 16 has an outer side surface 16a which defines an intermediate surface 6a of the trim strip 6. It also has an outer lower surface 16b which is generally parallel to and contacts a second section 24b of the lower surface 24, see FIG. 5C. As can be discerned from FIGS. 3 and 5C, the intermediate surface 6a extends between an upper or "show" surface 12 and a lower or "hidden" surface 24 of the strip 6. A seam line 10 extending between the upper and intermediate surfaces 12 and 6a, shown in FIG. 3A, is positioned so as to not be clearly visible when viewing the show surface 12 of the trim strip 6.

Figure 4D:
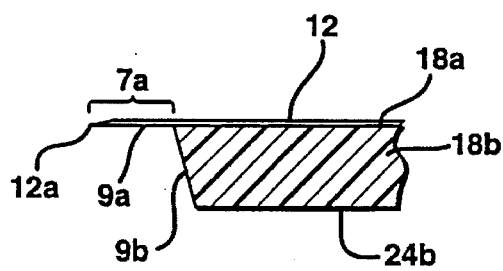
FIG. 4D is a cross-sectional view of a portion of the polymeric strip shown in FIG. 4C.
Figure 4A:
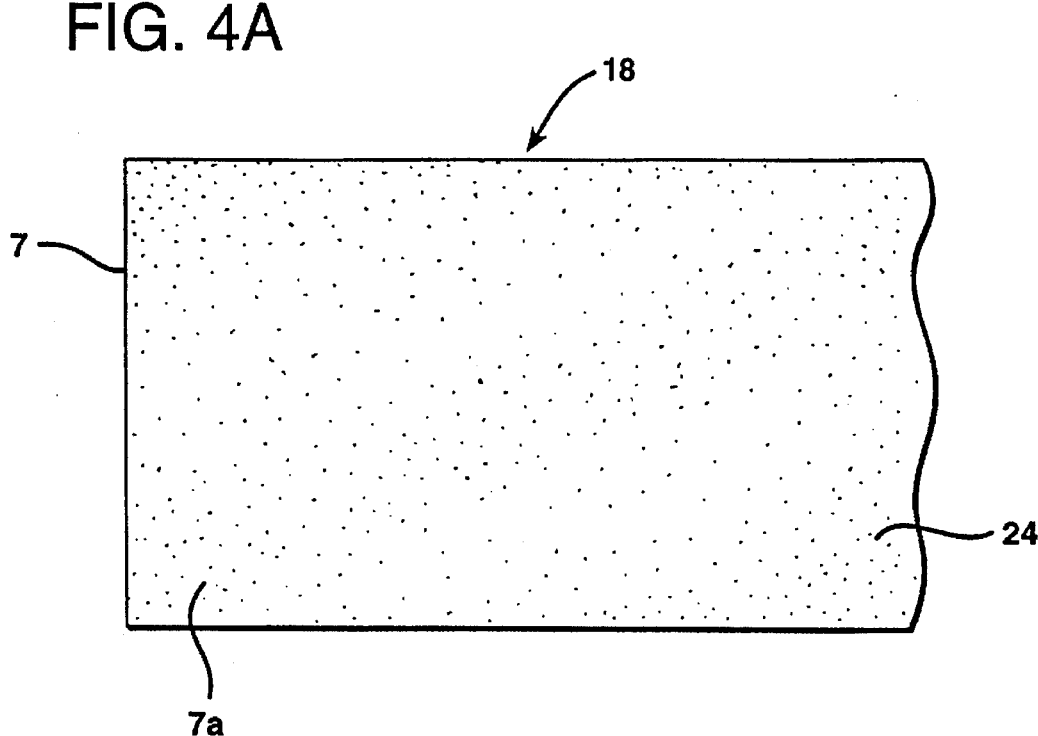
FIG. 4A is a bottom view, broken away, of a polymeric strip used to form the trim strip of FIG. 3.
Figure 4B:
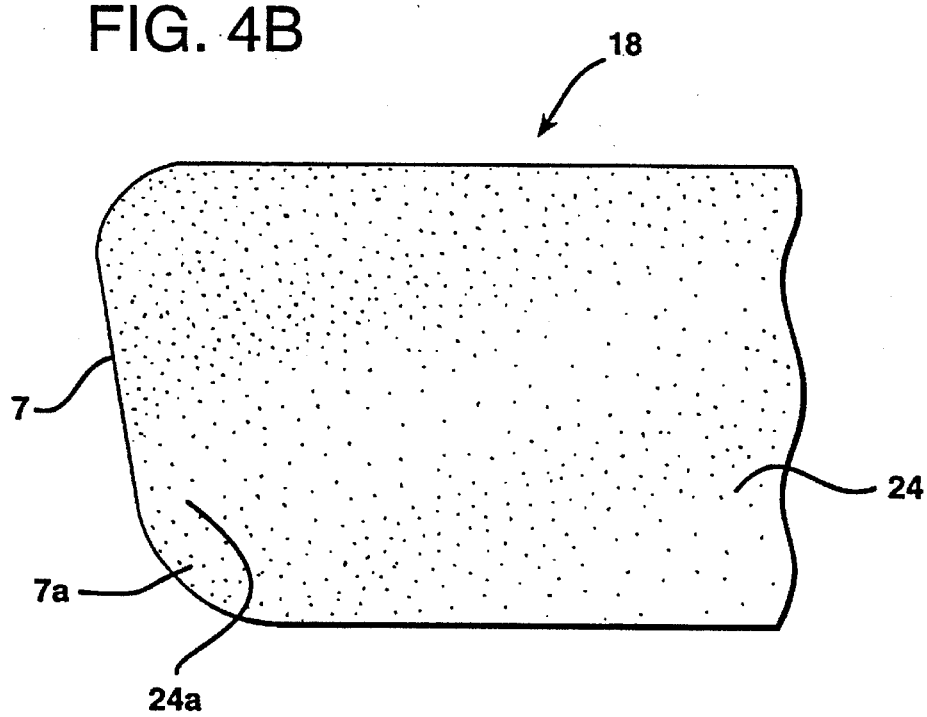
FIG. 4B is a bottom view, broken away, of the polymeric strip of FIG. 4A after it has been cut to a predetermined contour.

The trim strip 6 is formed by first providing an elongate, polymeric strip 18 having a predetermined length, see FIG. 4A. Strip 18 may be cut to the predetermined length having a generally straight end, as shown in FIG. 4A, or with an end having curved outer edges, as shown in FIG. 4B.

Polymeric strip 18 is typically formed from polyvinyl chloride (PVC) but may also be formed from other similar polymeric material such as, a thermoplastic olefin (TPO), a thermoplastic urethane (TPU), or a thermoplastic elastomer (TPE), all of which are commercially available. In the illustrated embodiment, the strip 18 is co-extruded as a double layer structure. However, it is also contemplated that the strip 18 may be extruded as a single layer structure or may be molded. The double layer strip 18 comprises an upper or "show" surface layer 18a which is relatively thin as compared to the lower or core layer 18b, see FIG. 4D. Typically, the core layer 18b is formed from substantially the same material as the show surface layer 18a but is foamed in order to reduce the total mass or weight of the strip. The reduced mass allows for improved adhesion at reduced cost by minimizing the adverse effects trim strip mass has on the bond created between the trim strip and an object to which it is adhered. However, the core layer 18b need not be foamed if a non-foamed core is more preferable for other reasons, e.g., reduced cost, increased durability, etc. In such a case, the core layer 18b may be a less expensive, lower grade of the selected material than the show surface layer 18a. For example, the core layer 18b could be a recycled PVC material and the show surface layer 18a could be a virgin PVC. In such a case, the virgin PVC is still preferred for the show surface layer 18a because its outer surface serves as the visible show surface 12 of the trim strip 6.

If the extruded piece includes a plasticizer component, a barrier coating (not shown) is applied to the hidden surface 24 of the strip 6 to prevent plasticizer migration to the adhesive layer provided between the strip 6 and the object to which the strip is to be secured. Otherwise, the plasticizer migration would lead to degradation of the bond between the trim strip and the object.

Applied to the upper surface 12 in the illustrated embodiment is a decorative laminate 14, see FIG. 3A. Preferably, the laminate 14 comprises an aluminized polyester film having a thin layer of polyvinyl chloride on its underside. The decorative laminate 14 is applied to the strip 18 just after extrusion from an extrusion device. This allows the thin layer of polyvinyl chloride on the underside of the decorative laminate to bond with the heated extruded material of the show surface layer 18a of the strip 18.

The polymeric strip 18 further includes a substantially transparent outer layer 19 applied over the decorative laminate 14. The outer layer is formed from a material which, preferably, is clear polyvinyl chloride or any of the other materials listed above which may be used to form the strip 18. The transparent layer is applied substantially concurrently with the decorative laminate 14.

Figure 4C:
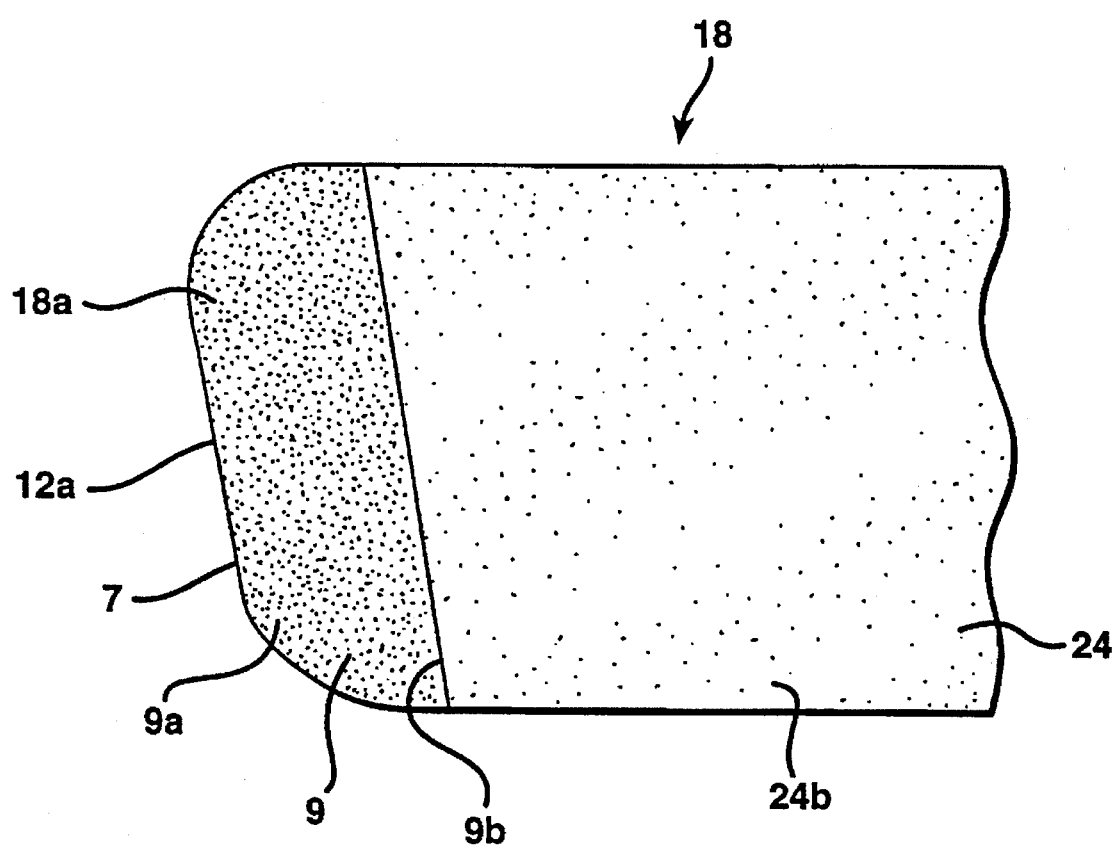
FIG. 4C is a bottom view, broken away, of a polymeric strip of the present invention following a material removal step.
Figure 5A:
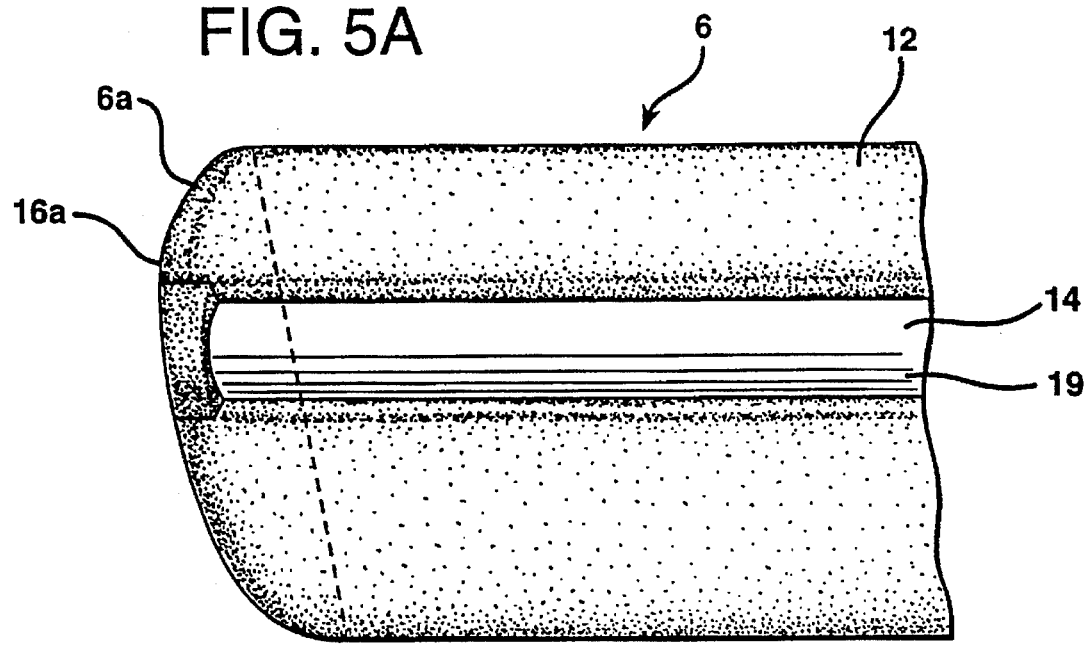
FIG. 5A is a top view, broken away, of a trim strip of the present invention following an injection molding step.
Figure 5B:
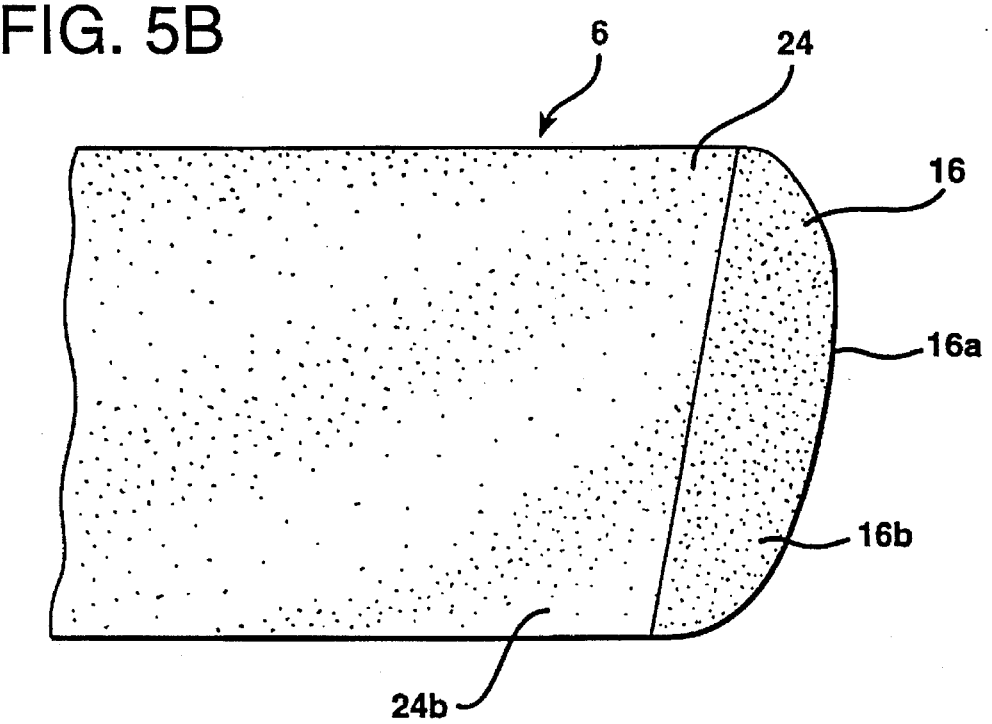
FIG. 5B is a bottom view, broken away, of trim strip of the present invention following an injection molding step.

In the illustrated embodiment, material from at least end portion 7a of the strip 18 is removed to form a recess or cavity 9, see FIGS. 4C and 4D. Material is removed inwardly from end 7 of end portion 7a and a first section 24a of the lower surface 24, see FIG. 4B, such that the cavity 9 is formed having first and second surfaces 9a and 9b which are positioned generally orthogonal to one another. In the illustrated embodiment, the first surface 9a comprises the back side of the upper or show surface layer 18a. The cavity 9 is preferably formed by making a first cut along a plane generally parallel to the lower surface 24 at or near the interface between the show surface and core layers 18a and 18b. The first cut extends into the strip 18 approximately 0.25 inch from end 7. A second cut is made generally orthogonal to the first cut and approximately 0.25" from the end 7 and to the depth of the first cut. Preferably, a similar cavity (not shown) is formed in the other end of the strip 18.

It is also contemplated that the cavity 9 may be formed by a grinding or other similar process. It is further contemplated that the cavity 9 need not comprise substantially orthogonal surfaces. Further, the cavity may be formed by a cutting or grinding process which forms only a single surface (not shown) extending from upper show surface 12 to the hidden surface 24. The cross section of the single surface may follow a generally linear path or a curved contour.

The surfaces 9a and 9b of the cavity 9 formed in the strip 18 define a bonding surface for the material injection molded to form the intermediate portion 16. Prior to injection molding, a heat activated adhesive is applied to the surfaces 9a and 9b to help bond the injection molded material to the polymeric strip 18.

After the adhesive has been applied to the cavity 9, the end portion 7a (see FIG. 4D) is placed within the inner cavity of a conventional injection mold (not shown) and polymeric material, such as polyvinyl chloride, is injected into the mold to fill the cavity 9 and form the intermediate portion 16. While the end portion 7a is in the mold, the edge 12a of the show surface 12 is reshaped, i.e., slightly rolled over, so that the edge 12a meets with the injection molded material slightly below the remaining portion of the show surface 12, see FIG. 5C. After the injected polymeric material has substantially cooled, the finished trim strip 6 is removed from the mold.

Figure 6:
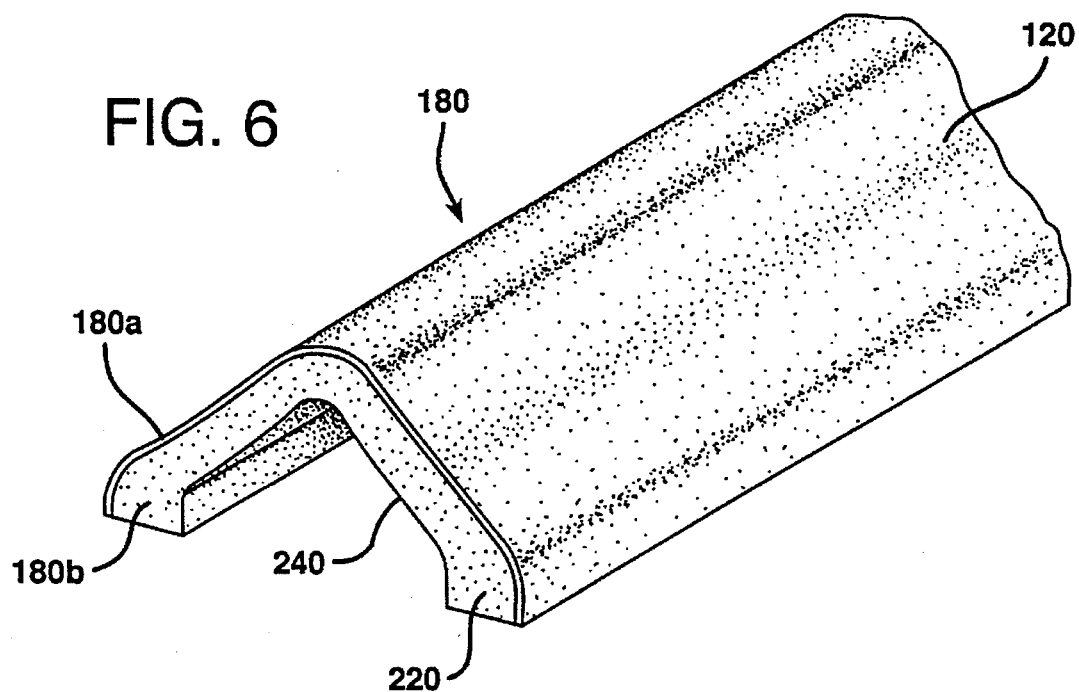
FIG. 6 is a perspective view, broken away, of a polymeric strip from which a trim strip in accordance with a second embodiment of the present invention is formed.

A trim strip 60 having a substantially V-shaped cross section and formed in accordance with a second embodiment of the present invention will now be described with reference to FIGS. 6–11. The strip 60 is formed by first providing a substantially V-shaped polymeric strip 180 of a predetermined length, see FIG. 6. FIG. 6 shows the polymeric strip 180 after it has been cut so as to have a straight end 220. The strip 180 comprises a first outer layer 180a of first material having an outer surface which defines an upper surface 120 of the polymeric strip 180 and a second core layer 180b of second material which comprises a remainder of the polymeric strip. The inner surface of the core layer 180b defines a lower or "hidden" surface 240 of the strip 60. It is further contemplated that an inner third material layer may be provided to define an inner hidden surface 240 with the core layer being interposed between the first and third layers. The various layers of the strip 180 may be formed from any of the materials listed above which are used in forming strip 18.

Figure 7:
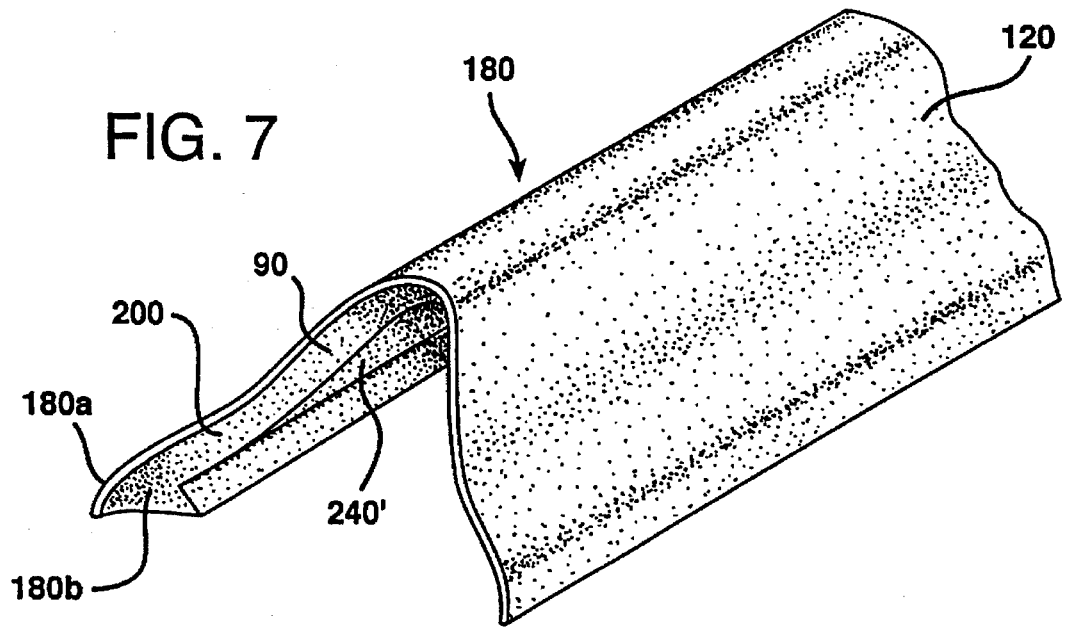
FIG. 7 is a perspective view, broken away, of the polymeric strip of FIG. 6, an end portion of which has been ground, skived or cut.
Figure 10:
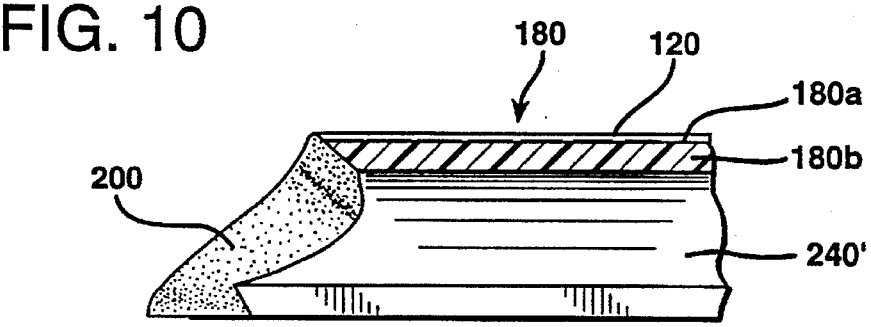
FIG. 10 is a cross-sectional view of an end portion of the trim strip shown in FIG. 7.
Figure 11:
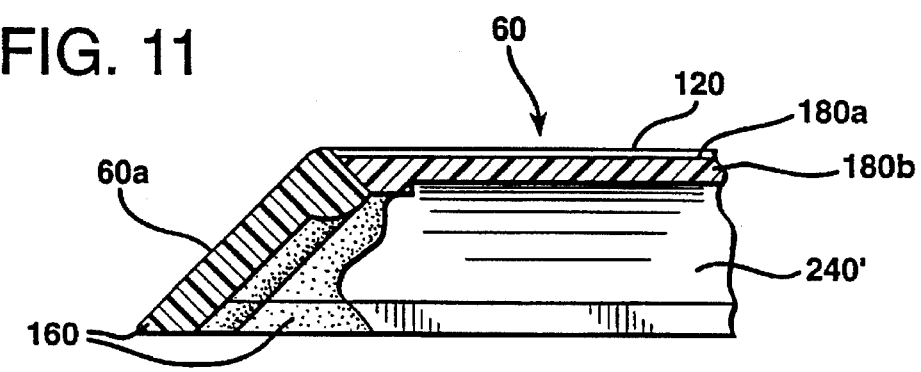
FIG. 11 is a cross-sectional view taken generally along section line 11—11 of FIG. 9.

FIGS. 7 and 10 illustrate the polymeric strip 180 after a cavity 90 has been created by removing material from an end portion of the strip 180. When forming the cavity 90, a first section (not shown) of the hidden surface is removed leaving a second section 240' remaining. The surface of the cavity defines a bonding surface 200 to which injected polymeric material, such as PVC, bonds. The cavity may be formed by cutting, grinding or other like processes.

Figure 8:
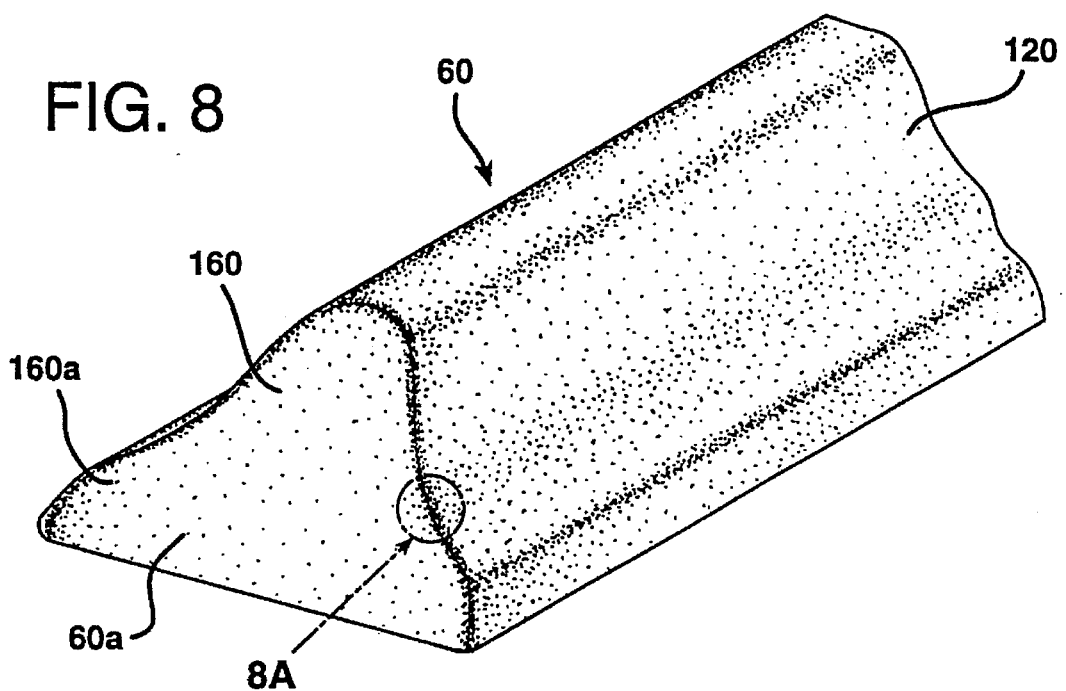
FIG. 8 is a perspective view, broken away, of the polymeric strip of FIG. 7, an end portion of which has been subject to injection molding to form a trim strip.
Figure 8A:
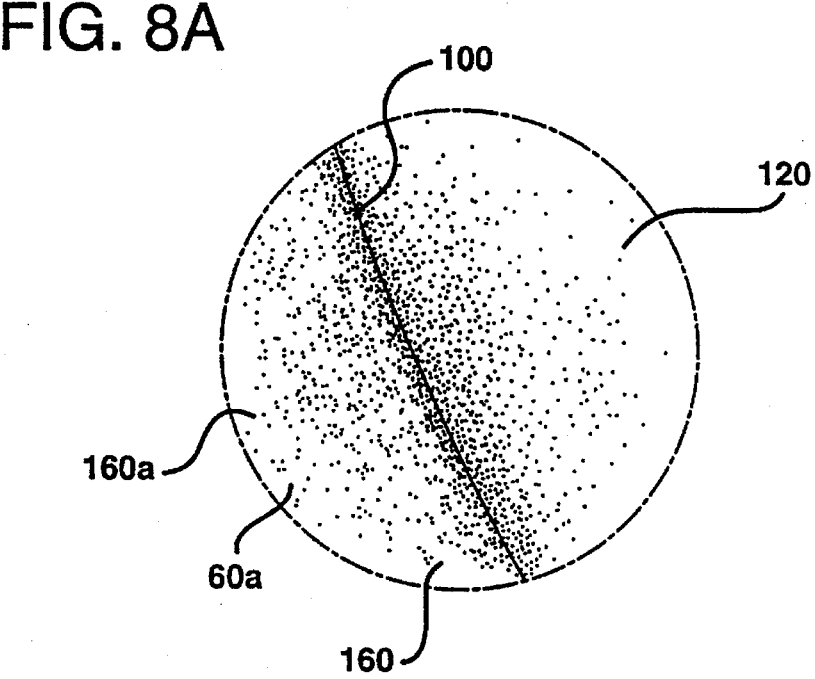
FIG. 8A is a magnified view of a portion of the trim strip shown in FIG. 8.
Figure 9:
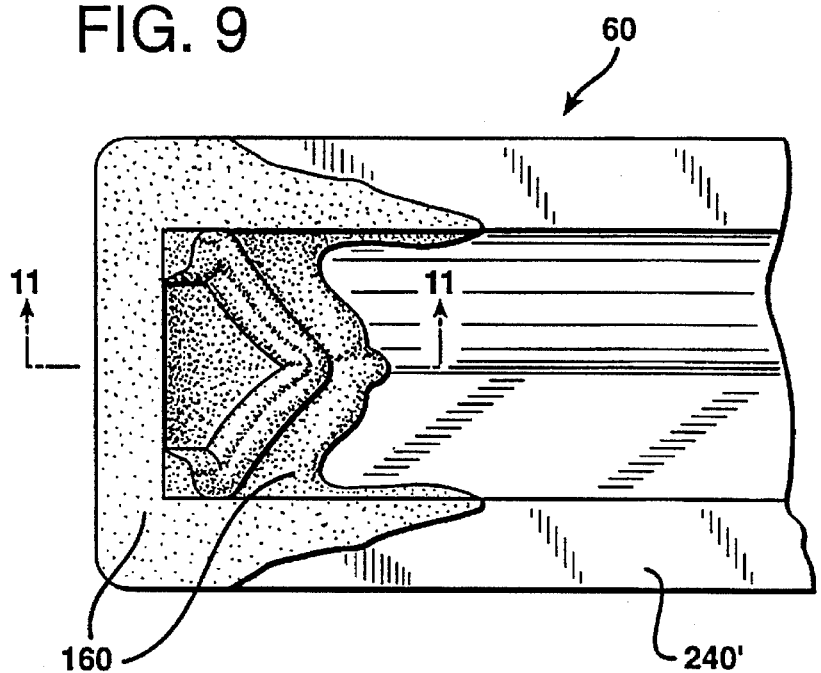
FIG. 9 is a bottom view of the trim strip shown in FIG. 8.

Prior to injection molding, a heat activated adhesive, such as the one described above, is applied to the inner surface of the cavity 90. The end portion of the strip 180 is then placed within the inner cavity of a conventional injection mold. Polymeric material, such as PVC, is injected into the mold to fill the cavity and form an intermediate portion 160, see FIG. 8. The intermediate portion 160 has an outer side surface 160a which defines an intermediate surface 60a of the trim strip 60. A seam line 100, shown in FIG. 8A, extends between upper and intermediate surfaces 120 and 60a. Because of its location, the seam line 180 is not readily visible from the show surface 120 of the trim strip 60.

It is contemplated by the present invention that the second end of the polymeric strips 18 and 180 may be subject to the material removal and injection molding defined herein. It is further contemplated by the present invention that any material removal method effective to yield a polymeric strip having an appropriate bonding surface may be employed. Similarly, it is contemplated by the present invention that removal methods resulting in bonding surface profiles different than those shown in FIGS. 4C, 7 and 10 may be employed.

Having described the invention in detail and by reference to preferred embodiments thereof, it will be apparent that modifications and variations are possible without departing from the scope of the invention defined in the appended claims.

What is claimed is:

1. A trim strip comprising:

an elongate, polymeric strip of a predefined length having a show surface, a lower surface which is spaced from said show surface, and first and second ends, at least one of said first and second ends having a recess, and at least a portion of said recess being filled with polymeric filler material, said polymeric filler material defining an exterior intermediate surface continuous with said show surface.

2. The trim strip of claim 1, further including an adhesive positioned between the polymeric filler material and the polymeric strip.

3. The trim strip of claim 1, wherein said polymeric strip comprises a first outer layer of first material having an outer surface which defines the show surface of the polymeric strip and a second core layer of second material which comprises a remainder of the polymeric strip.

4. A trim strip comprising:

an elongate, polymeric strip having a predefined length, a show surface, a second surface which is spaced from said show surface, and first and second ends, at least one of said first and second ends having a cavity and at least a portion of said cavity being filled with polymeric filler material such that said polymeric filler material defines an exterior intermediate surface, said exterior intermediate surface being continuous with at least said show surface.

5. The trim strip of claim 4, wherein said intermediate surface is continuous with said second surface.

6. The trim strip of claim 4, wherein said intermediate surface occupies an area formerly occupied by a first section of said second surface.

7. The trim strip of claim 4, wherein said intermediate surface contacts a second section of said second surface.

8. The trim strip of claim 4, further including an adhesive positioned between said polymeric filler material and the polymeric strip.

9. The trim strip of claim 4, wherein said polymeric strip comprises a first outer layer of first material having an outer surface which defines the show surface of the polymeric strip and a second core layer of second material which comprises a remainder of the polymeric strip.

* * * * *

UNITED STATES PATENT AND TRADEMARK OFFICE
CERTIFICATE OF CORRECTION

PATENT NO. : 5,641,547
DATED : June 24, 1997
INVENTOR(S) : David Dwight Dilley

It is certified that error appears in the above-identified patent and that said Letters Patent is hereby corrected as shown below:

On the title page, item [54] and column 1, line 2, before "SAME" insert --THE--.

On the title page, item [22], "Sep. 13, 1995" should be --Sep. 19, 1995--.

Signed and Sealed this

Twenty-fifth Day of November, 1997

Attest:

BRUCE LEHMAN

*Attesting Officer*  *Commissioner of Patents and Trademarks*